Feb. 16, 1926. 1,573,500
Z. OLSSON
LAMP WICK
Filed Oct. 10, 1922
Treated with an aqueous solution of Alum, Ammonium sulphate and Oxalic acid.
INVENTOR
Z. Olsson
BY
Sigmund Herzog
ATTORNEY Patented Feb. 16, 1926.

1,573,500

UNITED STATES PATENT OFFICE.

ZACHARIAS OLSSON, OF NEW YORK, N. Y., ASSIGNOR, BY MESNE ASSIGNMENTS, TO BURGOYNE LIGHT & SIGNAL CORPORATION, OF NEW YORK, N. Y., A CORPORATION OF DELAWARE.

LAMP WICK.

Application filed October 10, 1922. Serial No. 593,641.

*To all whom it may concern:*

Be it known that I, ZACHARIAS OLSSON, a citizen of Sweden, and resident of the city of New York, in the county of Richmond and State of New York, have invented certain new and useful Improvements in Lamp Wicks, of which the following is a specification.

The present invention relates to improvements in wicks, used in lamps, lanterns and heaters, such as oil stoves.

The ordinary fibrous wick requires frequent trimming, its burning and carbonizing, which causes the burner to smoke and eventually flicker or become extinguished.

The main object of the present invention is to so treat the ordinary fibrous lamp wick that it becomes practically incombustible, and yet its capillary attraction for the liquid fuel is not destroyed by reason of its treatment to render it incombustible.

In carrying out the invention, a wick made of vegetable fiber, such as cotton, woven together in the usual manner is employed. This wick, which is ignitible, is treated by saturating the same in a liquid compound, so as to render it non-inflammable.

The composition consists of a mixture of alum, ammonium sulphate and oxalic acid, dissolved in water. In preparing the composition, the ingredients are used, preferably, in about the following proportions, viz:

| | Parts by weight. |
|---|---|
| Alum | 40 |
| Ammonium sulphate | 160 |
| Oxalic acid | 10 |

These ingredients, after having been pulverized, are dissolved in water, the quantity of water depending largely upon the desired consistency or density of the compound.

The wick, illustrated in the accompanying drawing, is saturated with this compound, and after the solvent, that is to say the water, has been evaporated, the wick is ready for use. It has been found that such wicks result in the production of a clear smokeless flame, are more durable than untreated wicks, and do not accumulate a carbonized edge. Experiments have shown that, notwithstanding the treatment above referred to, the capillary attraction of the wick is not influenced, a free flow of fuel to the point of combustion being permitted.

What I claim is:—

1. A lamp wick rendered incombustible by being impregnated with a compound consisting of alum, ammonium sulphate, oxalic acid and a solvent.

2. A lamp wick rendered incombustible by being impregnated with a compound consisting of alum, ammonium sulphate, oxalic acid and water.

Signed at New York, in the county of New York, and State of New York, this 8th day of September, A. D., 1922.

ZACHARIAS OLSSON.